(12) United States Patent
Kadous et al.

(10) Patent No.: US 10,374,777 B2
(45) Date of Patent: Aug. 6, 2019

(54) CONTROL SIGNALING IN A SHARED COMMUNICATION MEDIUM

(71) Applicant: QUALCOMM Incorporated, San Diego, CA (US)

(72) Inventors: Tamer Adel Kadous, San Diego, CA (US); Chirag Sureshbhai Patel, San Diego, CA (US); Ahmed Kamel Sadek, San Diego, CA (US); Nachiappan Valliappan, Sunnyvale, CA (US); Tao Luo, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 15/249,954

(22) Filed: Aug. 29, 2016

(65) Prior Publication Data
US 2017/0093545 A1 Mar. 30, 2017

Related U.S. Application Data

(60) Provisional application No. 62/212,433, filed on Aug. 31, 2015.

(51) Int. Cl.
*H04L 5/00* (2006.01)

(52) U.S. Cl.
CPC .......... *H04L 5/0055* (2013.01); *H04L 5/0094* (2013.01); *H04L 5/001* (2013.01); *H04L 5/0039* (2013.01)

(58) Field of Classification Search
None
See application file for complete search history.

(56) References Cited

U.S. PATENT DOCUMENTS

2014/0286255 A1* 9/2014 Nam ................ H04L 1/1861
370/329
2015/0264710 A1 9/2015 Kneckt

FOREIGN PATENT DOCUMENTS

EP 2509380 * 3/2011 ............ H04W 72/04
EP 2816858 A1 12/2014

OTHER PUBLICATIONS

ETSI EN 301 893 V1.7.1, Broadband Radio Access Network, Jun. 2012.*

(Continued)

*Primary Examiner* — Kent K Krueger
(74) *Attorney, Agent, or Firm* — MG-IP Law, P.C.

(57) ABSTRACT

Techniques for communication are disclosed. A method may include selecting from a subframe two or more resource elements for control signaling, wherein the subframe includes a plurality of symbol periods and each symbol period includes a plurality of resource elements, wherein the selected two or more resource elements are associated with a concurrent symbol period, and transmitting a resource allocation message to an access terminal, wherein the resource allocation message indicates that the selected two or more resource elements are allocated for control signaling.

40 Claims, 8 Drawing Sheets

(56) References Cited

OTHER PUBLICATIONS

Huawei et al., "Support of UL Transmission for LAA," 3GPP Draft; R1-151302, 3rd Generation Partnership Project (3GPP), Mobile Competence Centre ; 650, Route des Lucioles ; F-06921 Sophia-Antipolis Cedex ; France, [Online] vol. RAN WG1, No., Belgrade, Serbia; Apr. 20-24, 2015, Apr. 10, 2015 (Apr. 10, 2015), pp. 1-6, XP050949750. Retrieved from the Internet: URL:http://www.3gpp.org/ftp/tsg_ran/WG1_RL1/TSGR1_80b/Docs/>—[retrieved on Apr. 10, 2015].
International Search Report and Written Opinion—PCT/US2016/049778—ISA/EPO—dated Nov. 24, 2016.
Qualcomm Incorporated: "Uplink Waveform for LAA ," 3GPP Draft; R1-152790—Uplink Waveform for LAA, 3rd Generation Partnership Project (3GPP), Mobile Competence Centre ; 650, Route des Lucioles ; F-06921 Sophia-Antipolis Cedex; France, [Online] vol. RAN WG1, No. Fukuoka, Japan; Apr. 25-29, 2015, May 16, 2015 (May 16, 2015), pp. 1/4-4/4, XP050971219, Retrieved from the Internet: URL:http://www.3gpp.org/ftp/tsg ran/WG1 RL1/TSGR1_81/Docs/>—[retrieved on May 16, 2015].

\* cited by examiner

CONTROL SIGNALING IN A SHARED COMMUNICATION MEDIUM

CROSS-REFERENCE TO RELATED APPLICATION

The present application for patent claims the benefit of Provisional Patent Application No. 62/212,433, entitled "CONTROL SIGNALING IN A SHARED COMMUNICATION MEDIUM," filed Aug. 31, 2015, and assigned to the assignee hereof and hereby expressly incorporated herein by reference in its entirety.

INTRODUCTION

Aspects of this disclosure relate generally to telecommunications, and more particularly to co-existence on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for communication are disclosed. The following summary is an overview provided solely to aid in the description of various aspects of the disclosure and is provided solely for illustration of the aspects and not limitation thereof.

In one example, a method is disclosed. The method may include, for example, selecting from a subframe two or more resource elements for control signaling, wherein the subframe includes a plurality of symbol periods and each symbol period includes a plurality of resource elements, wherein the selected two or more resource elements are concurrent resource elements included in a same symbol period, and transmitting a resource allocation message to an access terminal, wherein the resource allocation message indicates that the selected two or more resource elements are allocated for control signaling.

In another example, an apparatus is disclosed. The apparatus may include, for example, means for selecting from a subframe two or more resource elements for control signaling, wherein the subframe includes a plurality of symbol periods and each symbol period includes a plurality of resource elements, wherein the selected two or more resource elements are concurrent resource elements included in a same symbol period, and means for transmitting a resource allocation message to an access terminal, wherein the resource allocation message indicates that the selected two or more resource elements are allocated for control signaling.

In another example, another apparatus is disclosed. The apparatus may include, for example, at least one processor and at least one memory coupled to the at least one processor, the at least one processor and at least one memory being configured to select from a subframe two or more resource elements for control signaling, wherein the subframe includes a plurality of symbol periods and each symbol period includes a plurality of resource elements, wherein the selected two or more resource elements are concurrent resource elements included in a same symbol period. The apparatus may further comprise a transceiver, the transceiver being configured to transmit a resource allocation message to an access terminal, wherein the resource allocation message indicates that the selected two or more resource elements are allocated for control signaling.

In another example, a computer-readable medium comprising at least one instruction for causing a computer or processor to perform operations is disclosed. The computer-readable medium may include, for example, code for selecting from a subframe two or more resource elements for control signaling, wherein the subframe includes a plurality of symbol periods and each symbol period includes a plurality of resource elements, wherein the selected two or more resource elements are concurrent resource elements included in a same symbol period, and code for transmitting a resource allocation message to an access terminal, wherein the resource allocation message indicates that the selected two or more resource elements are allocated for control signaling.

In another example, another method is disclosed. The method may include, for example, receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period, and transmitting uplink control signaling on the indicated two or more resource elements.

In another example, another apparatus is disclosed. The apparatus may include, for example, means for receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period, and means for transmitting uplink control signaling on the indicated two or more resource elements.

In another example, another computer-readable medium comprising at least one instruction for causing a computer or processor to perform operations is disclosed. The computer-readable medium may include code for receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period, and code for transmitting uplink control signaling on the indicated two or more resource elements In another example, another apparatus is disclosed. The apparatus may include, for example, at least one processor and at least one memory coupled to the at least one processor, the at least one processor and at least one memory being configured to receive a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period. The apparatus may further comprise a transceiver, the transceiver being configured to transmit uplink control signaling on the indicated two or more resource elements.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
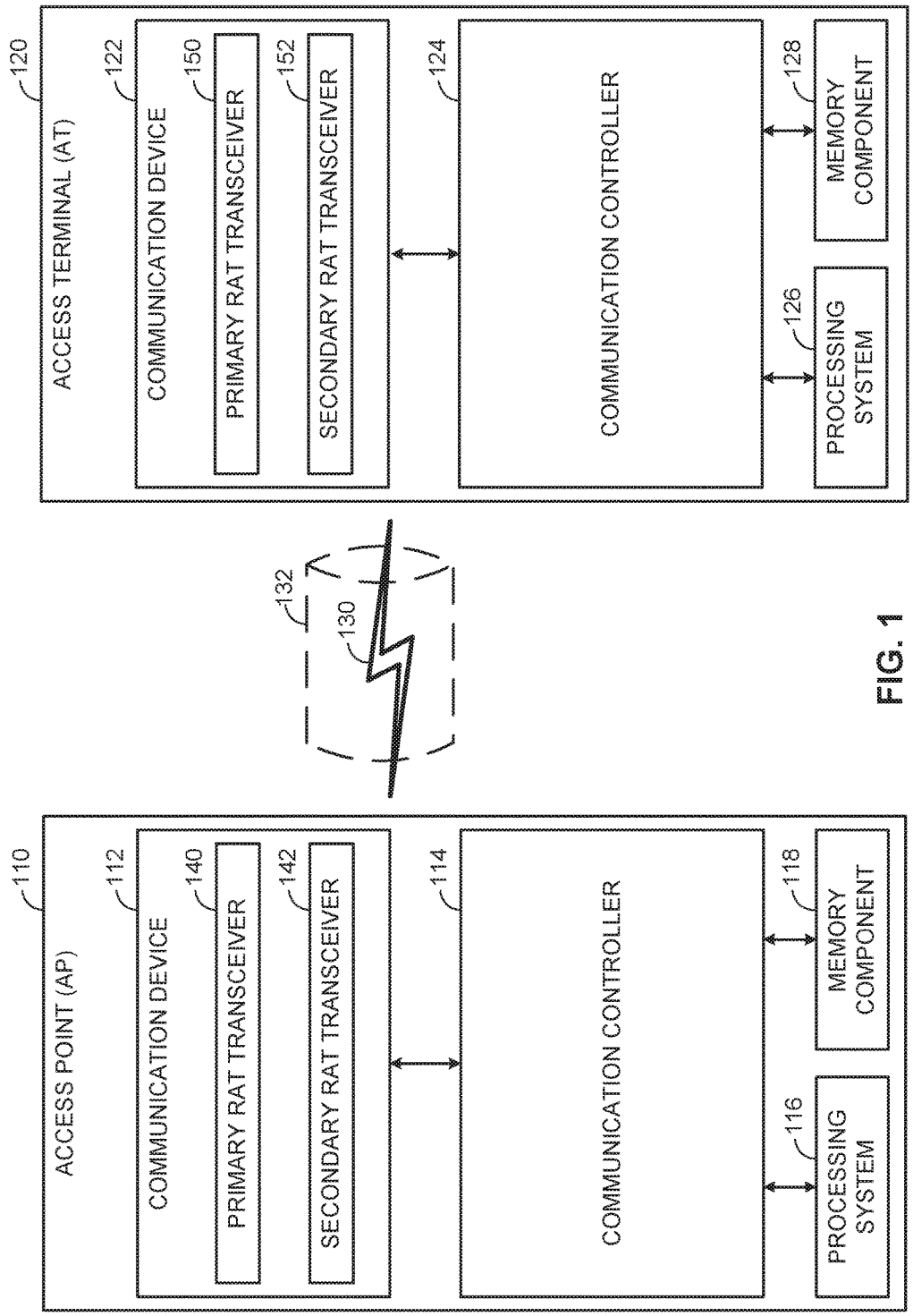
FIG. 1 illustrates an example wireless communication system including an access point in communication with an access terminal.

The present disclosure relates generally to co-existence techniques for operation on a shared communication medium.

In wireless systems, a node (for example, an access point) may allocate resources to another node (for example, an access terminal). The allocation may indicate when (in the time domain) and where (in the frequency domain) the access terminal is permitted to transmit signaling (for example, uplink control signaling). Conventionally, the allocation may be at a particular frequency or tone and the duration may extend over a sequence including a plurality of consecutive symbol periods.

Under some conditions, transmissions that extend beyond a certain duration (i.e., a certain number of symbol periods) may necessitate compliance with regulation. For example, the European Telecommunications Standards Institute (ETSI) contention rule mandates that if an access terminal is to transmit for any duration of time beyond a certain threshold (for example, 5% over a given duration of time), then the access terminal must first contend for access to the communication medium. As will be discussed in greater detail below, this trigger may be avoided if the allocation can be tailored to the contention rule. In particular, the same amount of resources can be allocated if the resource elements are spread across the frequency domain (for example, across a plurality of tones) rather than across the time domain (for example, across a plurality of symbol periods).

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless communication system including an access point in communication with an access terminal. Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (JOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128 coupled to the processing systems 116 and 126, respectively, and configured to store data, instructions, or a combination thereof, either as on-board cache memory, separate components, a combination, etc.). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate as part of a cell, including Primary Cells (PCells) and Secondary Cells (SCells), on respective component carriers (respective frequencies). The wireless link 130 may operate over a communication medium of interest that includes the component carriers, shown by way of example in FIG. 1 as the communication medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 132.

As an example, the communication medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by WLAN technologies, most notably IEEE 802.11x WLAN technologies generally referred to as "Wi-Fi."

Figure 2:
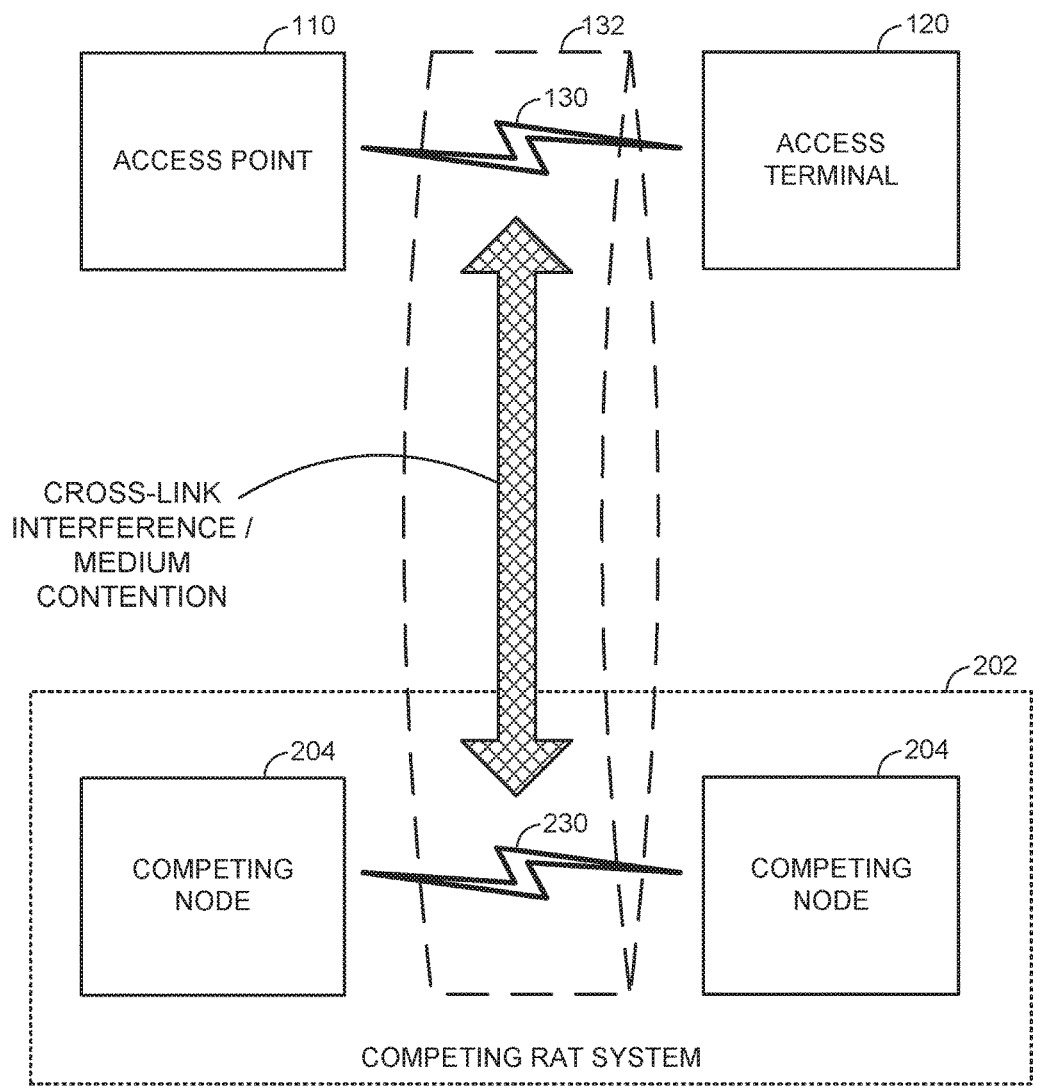
FIG. 2 is a system-level diagram illustrating contention between Radio Access Technologies (RATs) on a shared communication medium.

FIG. 2 is a system-level diagram illustrating contention between RATs on a shared communication medium such as the communication medium 132. In this example, the communication medium 132 used for communication between the access point 110 and the access terminal 120 is shared with a competing RAT system 202. The competing RAT system 202 may include one or more competing nodes 204 that communicate with each other over a respective wireless link 230 also on the communication medium 132. As an example, the access point 110 and the access terminal 120 may communicate via the wireless link 130 in accordance with Long Term Evolution (LTE) technology, while the competing RAT system 202 may communicate via the wireless link 230 in accordance with Wi-Fi technology.

As shown, due to the shared use of the communication medium 132, there is the potential for cross-link interference between the wireless link 130 and the wireless link 230. Further, some RATs and some jurisdictions may require contention or "Listen Before Talk (LBT)" for access to the communication medium 132. As an example, the Wi-Fi IEEE 802.11 protocol family of standards provides a Carrier Sense Multiple Access/Collision Avoidance (CSMA/CA) protocol in which each Wi-Fi device verifies via medium sensing the absence of other traffic on a shared medium before seizing (and in some cases reserving) the medium for its own transmissions. As another example, the European Telecommunications Standards Institute (ETSI) mandates contention for all devices regardless of their RAT on certain communication mediums such as unlicensed frequency bands.

Accordingly, it may be necessary in different scenarios for the access point 110 and/or the access terminal 120 to mitigate their interference to and from the competing RAT system 202, as well as to contend for access to the communication medium 132 with the competing RAT system 202.

Returning to the example of FIG. 1, the communication device 112 of the access point 110 includes two co-located transceivers operating according to respective RATs, including a primary RAT transceiver 140 configured to operate in accordance with one RAT to predominantly communicate with the access terminal 120 and a secondary RAT transceiver 142 configured to operate in accordance with another RAT to predominantly interact with other RATs sharing the communication medium 132 such as the competing RAT system 202. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may accordingly provide different functionalities and may be used for different purposes. Returning to the LTE and Wi-Fi example above, the primary RAT transceiver 140 may operate in accordance with LTE technology to provide communication with the access terminal 120 on the wireless link 130, while the secondary-RAT transceiver 142 may operate in accordance with Wi-Fi technology to monitor or control Wi-Fi signaling on the communication medium 132 that may interfere with or be interfered with by the LTE communications. The secondary RAT transceiver 142 may or may not serve as a full Wi-Fi access point providing communication services to an associated Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

Figure 3:
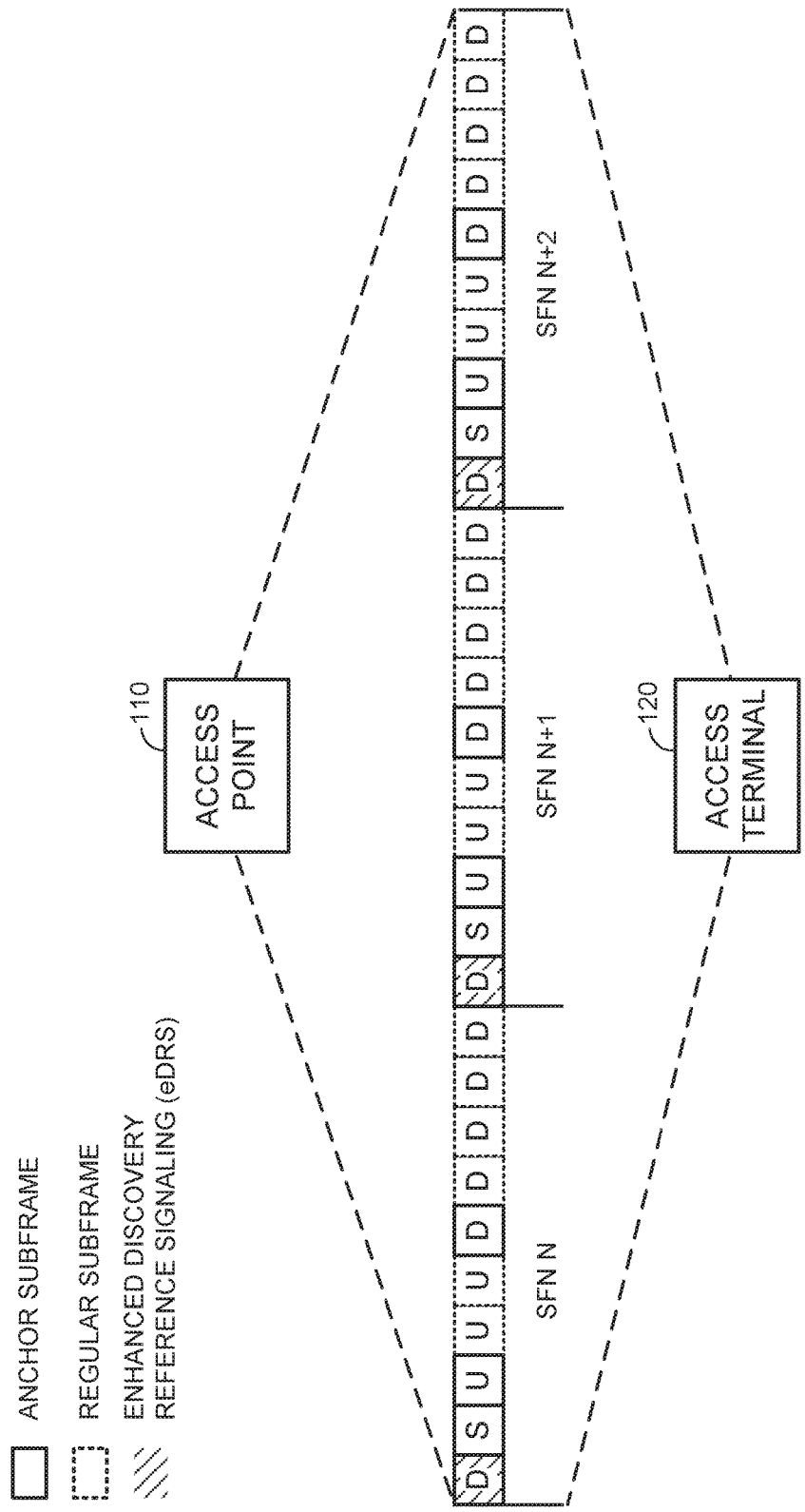
FIG. 3 illustrates an example virtual Time Division Duplexing (TDD) frame structure.

FIG. 3 illustrates an example virtual Time Division Duplexing (TDD) frame structure that may be implemented for the primary RAT on the communication medium 132 to facilitate contention-based access between the access point 110/access terminal 120 and the competing RAT system 202.

The illustrated frame structure includes a series of radio frames (RFs) that are numbered in accordance with a System Frame Number (SFN) numerology (SFN N, N+1, N+2, etc.) and divided into respective subframes (SFs), which may also be numbered for reference (e.g., SF0, SF1, etc.). Each respective subframe may be further divided into slots (not shown in FIG. 3), and the slots may be further divided into symbol periods. As an example, the LTE frame structure includes system frames that are divided into 1024 numbered radio frames composed of 10 subframes each, which together constitute an SFN cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

The example frame structure of FIG. 3 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 3, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 3 is virtual in that each subframe may or may not be occupied by primary RAT signaling in any given instance due to the contention procedure for accessing the communication medium 132. In general, if the access point 110 or the access terminal 120 fails to win contention for a given subframe that subframe may be silenced.

As is further illustrated in FIG. 3, one or more subframes may be designated to include what is referred to herein as Enhanced Discovery Reference Signaling (eDRS). The eDRS may be configured to convey control signaling for facilitating system operation. The control signaling may include information relevant to timing synchronization, system acquisition, interference measurements (e.g., Radio Resource Measurements (RRM)/Radio Link Measurements (RLM)), tracking loops, gain control (e.g., Automatic Gain Control (AGC)), paging, etc. The eDRS may be transmitted periodically (e.g., every 10 ms) in a designated subframe of each radio frame. For example, the eDRS may be transmitted in accordance with a periodicity eDRS_Cycle at each subframe satisfying the condition SFN mod eDRS_Cycle=0 (illustrated by way of example as the first subframe SF0). In some deployments, the access point 110 may transmit the designated eDRS subframe automatically, without contending for access to the communication medium 132. In other deployments, however, the access point 110 may be required to contend for access to the communication medium 132 to transmit the designated eDRS subframe.

In response to downlink transmissions received from the access point 110, the access terminal 120 may be configured to transmit control signaling on control channels to the access point 110. The control signaling may include, for example, acknowledgements (ACK/NACK) or channel state information (CSI). The acknowledgements may include feedback for one or more transmissions, for example, group ACKs (GACKs). The CSI may include a channel quality index (CQI), a rank index (RI), a precoder matrix index (PMI), or any combination thereof. The control signaling may also include reference signaling. The reference signaling may have a signal structure that is known to both the access point 110 and the access terminal 120, which may facilitate channel estimation and demodulation at the access point 110.

The acknowledgements may correspond to a single hybrid automatic repeat request (HARQ) process (a single subframe), or may span multiple HARQ processes (multiple subframes). For example, rather than transmitting information corresponding to a latest cycle of HARQ processes, the access terminal 120 may store HARQ feedback for a plurality of cycles and transmit HARQ feedback corresponding to a plurality of HARQ cycles and/or a plurality of HARQ processes. The access point 110 may request the HARQ feedback semi-statically or dynamically. The semi-static request may be characterized by an RRC configuration or semi-persistent signaling (for example, enable or disable using layer 1 signal but valid a period of time). The dynamic request may be carried in downlink control information format.

Conventionally, the control signaling may be transmitted to the access point 110 using a Physical Uplink Shared Channel (PUSCH) or a Physical Uplink Control Channel (PUCCH). For example, the access terminal 120 may be configured to use the PUSCH when there is application data or Radio Resource Control (RRC) signaling to be transmitted, and use the PUCCH in the absence of application data or RRC signaling.

In some implementations, the access terminal 120 transmits control signaling using an entire subframe on the PUCCH, and may be required to contend for access to the communication medium 132. The access terminal 120 may be required (by relevant technical standards, government regulations, etc.) to contend for access to the communication medium 132 prior to transmitting throughout an entire subframe. If the contention fails, then the access terminal 120 cannot transmit the control signaling, which will have a negative impact on the operations of the access point 110 and the access terminal 120.

In other implementations, an enhanced PUCCH (ePUCCH) is allocated to the access terminal 120. Like the PUCCH, the ePUCCH spans an entire subframe in the time domain. But the ePUCCH also occupies multiple resource blocks in the frequency domain. One or more resource blocks in ePUCCH may be interleaved such that they are not contiguous in the frequency domain. Intermediate resource blocks may be allocated for other transmissions (for example, PUSCH transmissions). Generally, the access point 110 may allocate the ePUCCH to a group of access terminals, and intermittently poll the group of access terminals for group ACKs (GACKs). The access terminals may then respond, using the allocated ePUCCH, with control signaling. However, whether using ePUCCH or PUCCH, the access terminal 120 may be required (by relevant technical standards, government regulations, etc.) to contend for access to the communication medium 132 prior to transmitting control signaling in a particular subframe, and if the access terminal 120 fails to win contention of the communication medium 132 for the subframe on which ePUCCH or PUCCH are to be transmitted, the control signaling may not be sent or may be delayed.

For example, if a latency-sensitive application like Voice over LTE (VoLTE) is operating, it is important that the access terminal 120 be able to transmit acknowledgements to the access point 110. If the access terminal 120 fails to win the communication medium 132 during a contention period, then the acknowledgements cannot be transmitted, and VoLTE operations may be negatively impacted. As another example, the access point 110 may rely on the CSI received from the access terminal 120 to perform scheduling. If the access terminal 120 fails to win the communication medium 132 during a contention period, then the CSI cannot be transmitted, and scheduling operations may be negatively impacted.

In accordance with an aspect of the present disclosure, the access terminal 120 transmits control signaling (acknowledgements, CSI, etc.) to the access point 110 while minimizing contention for the communication medium 132, and therefore avoids the possibility of failing to attain access the communication medium 132. Instead of transmitting control signaling using the PUCCH (as in the conventional approach), the access terminal 120 of the present disclosure uses what will be referred to as "short common control channel". The short common control channel signaling may be transmitted with minimum contention, for example, with no contention. When allocated for uplink signaling, the short common control channel signaling may be referred to as "sPUCCH" signaling. However, as will be described below, short common control channel signaling may be utilized on the downlink as well.

In accordance with another aspect of the present disclosure, the sPUCCH signaling may be configured to comply with contention-free transmission regulations. For example, the current ETSI contention rule mandates in Europe allow for a certain fraction of transmissions (e.g., 5% over a given duration of time) to proceed without the need for contention even though contention is otherwise generally required. The sPUCCH signaling of the present disclosure may be transmitted such that the access terminal 120 transmits control signaling on a control channel while minimizing contention for the communication medium 132 but remaining in compliance with the ETSI contention rule.

As noted above, latency-sensitive applications (like VoLTE) may benefit from minimizing contention. However, the sPUCCH signaling of the present disclosure may also be used for, for example, acknowledgements for high-priority traffic (for example, high-priority QoS classes) or fast CSI feedback. Accordingly, an access point 110 may specifically allocate resources for the access terminal 120 to transmit acknowledgements for high-priority traffic.

Figure 4:
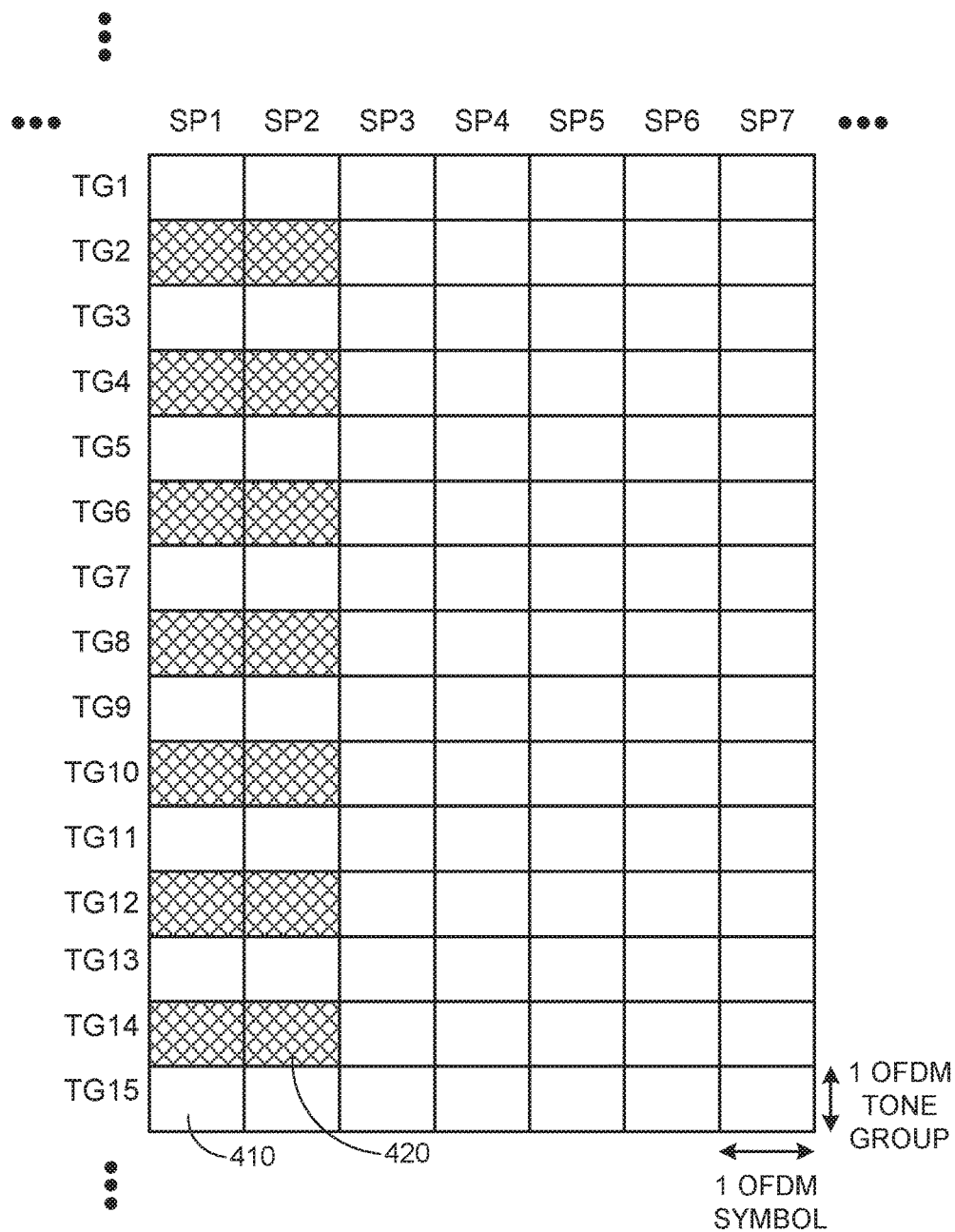
FIG. 4 illustrates a resource map in accordance with an aspect of the disclosure.

FIG. 4 is a resource map illustrating an example sPUCCH format that may be used in conjunction with the virtual TDD frame structure of FIG. 3. As depicted in FIG. 4, the resource map includes a horizontal axis representing the time domain and a vertical axis representing the frequency domain. The time domain is divided into symbol periods, for example, orthogonal frequency-division multiplexing (OFDM) symbol periods. Each symbol period may be capable of containing a single symbol. The frequency domain is divided into tones, for example, OFDM tones.

The resource map of FIG. 4 is divided into an array of resource elements. Each column in the resource map is associated with a single symbol period. It will be understood that resource elements in the same column may be referred to as being included in a same symbol period. As depicted in FIG. 4, there are seven symbol periods labeled SP1, SP2, SP3, SP4, SP5, SP6, and SP7. However, it will be understood that a resource map in accordance with the present disclosure may have more or fewer than seven symbol periods.

Each row in the resource map is associated with a single group of tones. Each tone group may include one or more tones. In LTE, for example, tones may be organized into 180 kHz tone groups consisting of twelve adjacent 15 kHz tones.

Therefore, in some implementations, the tone groups of FIG. 4 may include twelve adjacent 15 kHz tones and may align with 180 kHz LTE bands.

As depicted in FIG. 4, there are fifteen tone groups labeled TG1, TG2, TG3, TG4, TG5, TG6, TG7, TG8, TG9, TG10, TG11, TG12, TG13, TG14, and TG15. However, it will be understood that a resource map in accordance with the present disclosure may have more or fewer than fifteen tone groups.

Each rectangle in the resource map of FIG. 4, labeled as 410 or 420, may represent the resource element or resource elements associated with a unique combination of one symbol period and one tone group. The resource map comprises unselected resource elements 410 and control signaling resource elements 420. For brevity, labels are provided in FIG. 4 for one of the unselected resource elements 410 and one of the control signaling resource elements 420. However, it will be understood that the unselected resource elements 410 are generally depicted as blank rectangles and the control signaling resource elements 420 are generally depicted as hatched rectangles.

The resource map of FIG. 4 may be used by the access point 110 to allocate resources to the access terminal 120. For example, the access point 110 may select one or more particular resource elements for a particular purpose (for example, uplink control signaling). The access point 110 may then transmit a resource allocation message to the access terminal 120. The resource allocation message would indicate which particular resource elements (if any) are to be used by the access terminal 120 for uplink control signaling. The access terminal 120, after receiving the resource allocation message, would transmit uplink control signaling using the resource elements indicated in the resource allocation message. As noted above, each resource element represents a unique combination of one symbol period and one tone group.

Alternatively or additionally, the access point 110 may transmit a resource allocation message to a group of access terminals analogous to access terminal 120. The resource allocation may allocate common resources on which the group of access terminal can transmit control signaling. The transmissions may be code-division multiplexed so that the access point 110 can differentiate transmission from different access terminals.

The sPUCCH signaling of the present disclosure may be transmitted by the access terminal 120 on configured resources without requiring the access point 110 to poll the access terminal 120 for control signaling. By contrast, ePUCCH may be expected to carry control signaling only when polled by the access point 110.

In accordance with the present disclosure, the access point 110 may allocate resource for a particular access terminal 120 or group of access terminals 120 using any combination of PUCCH, ePUCCH, and the sPUCCH signaling of the present disclosure. However, the access point 110 may also adopt various allocation rules. For example, the access point 110 may assign sPUCCH signaling resources of the present disclosure to a transmission opportunity (TxOP) within an LBT frame. Alternatively or additionally, the access point 110 may assign sPUCCH signaling resources of the present disclosure outside an LBT frame to designated uplink subframes where the access point 110 has not reserved the communication medium 132.

As another example, the sPUCCH signaling of the present disclosure may be allocated to a subframe that also includes an ePUCCH allocation. To do so, the access point 110 may assign different interlaces (for example, different groups of non-contiguous resource blocks) to the ePUCCH resources and the sPUCCH signaling of the present disclosure. If the access terminal 120 is allocated resources in a subframe for both ePUCCH resources and the sPUCCH signaling of the present disclosure, the access terminal 120 may be configured to transmit control signaling using either ePUCCH resources or the sPUCCH signaling of the present disclosure, but not both.

In another example, the access point 110 may allocate the sPUCCH signaling of the present disclosure to subframes that do not contain ePUCCH resources.

The unselected resource elements 410 comprise resource elements that are not used for control signaling (acknowledgements, CSI, etc., as noted above). As used herein, "unselected" resource elements such as the unselected resource elements 410 are resource elements that are not selected by the access point 110 for transmitting control signaling. As a result, the access terminal 120 may not transmit using any symbol/tone combination that is associated with the unused resource elements 410. Additionally or alternatively, the access terminal 120 may transmit using the unused resource elements 410 to transmit signaling that does not include control signaling, for example, data, PUSCH signaling, etc.

The control signaling resource elements 420 in the resource map of FIG. 4 comprise resource elements that are allocated to and used by the access terminal 120 for control signaling (acknowledgements, CSI, etc., as noted above). For example, the access point 110 may allocate resource elements from among the control signaling resource elements 420 for control signaling, and the access terminal 120 may transmit control signaling on the uplink using the symbol periods and tones that are associated with the control signaling resource elements 420. The allocated control signal resource elements 420 may be allocated to an uplink subframe, a special subframe, or any other subframe to which control signaling resource elements may suitably be allocated.

Although the control signaling resource elements 420 depicted in FIG. 4 occupy the two earliest symbol periods (at the far left of the resource map), it will be understood that the resource map of FIG. 4 does not necessarily show every resource element that is available for allocation, and the control signaling resource elements 420 need not be among the earliest symbol periods selected. Moreover, the resource elements available for allocation may comprise an indefinite number of symbol periods and an indefinite number of tones or tone groups, and the resource map depicted in FIG. 4 may consist of a small fraction of a much larger array. For example, the control signaling resource elements 420 may occupy two successive symbol periods (as depicted in FIG. 4), three successive symbol periods, four successive symbol periods, etc.

In some implementations, the resource elements may be allocated using resource blocks, where each resource block includes a plurality of symbol periods and a plurality of tones. For example, LTE resource blocks may include seven successive symbol periods (having a total duration of 0.5 milliseconds) and twelve adjacent tones (spanning a 180 kHz band of frequencies). In this example, the LTE resource block would include an array of 84 resource elements.

In accordance with an aspect of the disclosure, two or more of the resource elements selected as control signaling resource elements 420 are concurrent. For example, the control signaling resource elements 420 may include two or more resource elements associated with a same symbol period. As depicted in FIG. 4, the control signaling resource elements 420 comprise multiple concurrent resource elements associated with SP1. For example, the resource elements located at SP1/TG2 and SP1/TG4, respectively, are concurrent.

As a further example, the multiple concurrent resource elements selected as control signaling resource elements 420 may be interleaved with unselected resource elements 410, i.e., separated from one another in the frequency domain, with unselected resource elements 410 therebetween. For example, as depicted in FIG. 4, the control signaling resource elements 420 located at SP1/TG2 and SP1/TG4, respectively, are separated from one another by one or more unselected resource elements 410 located at SP1/TG3. However, it will be understood that in some aspects of the present disclosure, the control signaling resource elements 420 may not be interleaved with unselected resource elements 410, or the number of unselected resource elements 410 may vary such that the separation (if any) between control signaling resource elements 420 is not uniform. Instead, the degree of separation in the frequency domain between neighboring control signaling resource elements 420 may vary. As noted above, the unselected resource elements 410 may be allocated by the access point 110 for other transmissions, for example, uplink data transmissions or uplink-related transmissions.

As yet a further example, the multiple concurrent resource elements selected as control signaling resource elements 420 may be associated with different resource blocks. For example, the tone groups TG1, TG2, etc., may each consist of twelve tones. Moreover, each tone group may align with the twelve tones in a resource block (for example, an LTE resource block). According to this example, the control signaling resource elements 420 located at SP1/TG2 and SP1/TG4, respectively, would be associated with different resource blocks.

In accordance with an aspect of the disclosure, the control signaling resource elements 420 may be selected such that they are restricted to particular symbol periods, or, in terms of the resource map of FIG. 4, restricted to particular columns. As shown, the control signaling resource elements 420 are restricted to two of the seven symbol periods depicted in FIG. 4. For example, as depicted in FIG. 4, the control signaling resource elements 420 may be restricted to two symbol periods, such that every resource elements selected as a control signaling resource elements 420 is associated with one of the two symbol periods.

Moreover, the control signaling resource elements 420 may be restricted to one or more symbol periods within a particular slot or subframe, such that the remaining symbol periods within the slot or subframe do not contain any control signaling resource elements 420. The number of symbol periods to which the control signaling resource elements 420 are restricted may be less than the total number of symbol periods in the slot or subframe that includes the control signaling resource elements 420. For example, the symbols periods SP1-SP7 depicted in FIG. 4 may be included in a particular slot of an LTE subframe. In this example, the control signaling resource elements 420 may be restricted to symbol periods SP1 and SP2 such that control signaling is restricted to symbol periods SP1 and SP2 and the remaining symbol periods in the subframe (SP3-SP7) do not contain any control signaling.

Accordingly, the control signaling resource elements 420 may include two or more resource elements for control signaling, wherein the selected two or more resource elements are concurrent resource elements included in a same symbol period (for example, the control signaling resource elements 420 in SP1, as depicted in FIG. 4), and may further include one or more successive resource elements for control signaling, wherein the one or more successive resource elements are included in one or more successive symbol periods to the symbol period in which the two or more resource elements are included (for example, the control signaling resource elements 420 in SP2, as depicted in FIG. 4). Moreover, the resource allocation message may indicate that the selected two or more resource elements and the successive resource elements are allocated for control signaling.

Further examples will be provided in order to distinguish the allocation of the present disclosure from conventional allocations. According to one conventional implementation, the access point 110 may allocate the control signaling resource elements 420 in the form of a PUCCH. Given a subframe that includes fourteen symbol periods having a total duration of one millisecond, the PUCCH may consist of fourteen resource elements occupying fourteen successive (i.e., non-concurrent) symbol periods. This PUCCH allocation may require the access terminal 120 to transmit control signaling throughout the entire duration of the subframe.

By contrast, the access point 110 of the present disclosure may allocate the resource elements in a different manner. In particular, the control signaling resource elements 420 may be condensed in the time domain and spread in the frequency domain (relative to the PUCCH implementation outlined in the foregoing example). Rather than allocate fourteen resource elements in successive symbol periods, the access point 110 of the present disclosure may allocate twelve concurrent resource elements on twelve different tones in a first symbol period and another twelve concurrent resource elements on twelve different tones in a second symbol period (as depicted in FIG. 4).

In accordance with another aspect of the present disclosure, the control signaling resource elements 420 may be arranged such that the transmissions of the access terminal 120 comply with contention-free transmission restrictions (e.g., technical standards, government regulations, etc.). For example, some restrictions require that an access terminal 120 that uses more than a particular percentage of available time-domain resources must contend for access to the communication medium 132 prior to transmitting. In particular, the current ETSI contention rule mandates allow for a certain fraction of transmissions (e.g., 5%) to proceed without the need for contention even though contention is otherwise generally required. The sPUCCH signaling of the present disclosure may be transmitted such that the access terminal 120 transmits the control signaling (e.g., using the fraction of transmissions allowed by ETSI contention rules) while minimizing contention for the communication medium 132, but remaining in compliance with the ETSI contention rule. Contention-free access may confer significant advantages for both the access point 110 and the access terminal 120, as noted above. For example, a contention rule may dictate that contention-free access must be limited to 10 milliseconds over a 200-millisecond duration. Accordingly, the sPUCCH signaling of the present disclosure may be adjusted so as to minimize contention by transmitting control signaling over the control channel for fewer than 10 milliseconds (less than 5%) over a 200-millisecond duration.

As an example, consider an implementation in which the access point 110 allocates a PUCCH that extends across every uplink subframe in a given radio frame. Returning to the example of FIG. 3, there may be three uplink subframes per radio frame in TDD Config 3, and the access terminal 120 would therefore be transmitting at least 30% of the time. Because the access terminal 120 would be transmitting 30% of the time, the access terminal 120 would be required (under the ETSI contention rule) to contend for access to the communication medium 132 before transmitting.

As another example, consider an implementation in which the access point 110 allocates a PUCCH that extends across just one uplink subframe in a given radio frame. In this scenario, the access terminal 120 would still be required to contend for access to the communication medium 132 before transmitting, because the access terminal 120 would be transmitting during at least 10% of the radio frame.

By contrast, the access terminal 120 of the present disclosure may transmit without contending for access while remaining in compliance with the ETSI contention rule. For example, consider an implementation in which a particular radio frame consists of one hundred and forty symbol periods, and the access point 110 allocates control signaling resource elements to the access terminal 120 on just two symbol periods of a single uplink subframe. As will be understood, this may be achieved by spreading the control signaling resource elements among several different tone groups. In this scenario, the access terminal 120 would be transmitting approximately 1.4% of the time. Accordingly, the access terminal 120 would not be required (under the ETSI contention rule) to contend for access to the communication medium 132 before transmitting.

As another example, consider an implementation in which the access terminal 120 transmits control signaling using two symbol periods in each uplink subframe of a radio frame. If the radio frame is a TFF Config 3 radio frame, then it will include three uplink subframes. In this scenario, the access terminal would be transmitting approximately 4.3% of the time. Accordingly, the access terminal 120 would not be required (under the ETSI contention rule) to contend for access to the communication medium 132 before transmitting.

In addition to facilitating compliance with contention rules (for example, the ETSI contention rule), control signaling in accordance with the resource map of FIG. 4 confers other advantages. For example, the access terminal 120 may be required (by relevant technical standards, government regulations, etc.) to limit power spectral density (i.e., transmit power per unit of frequency) to a certain value. By using control signaling resource elements 420 that are condensed in time (e.g., in terms of the number of symbol periods) and spread in frequency (e.g., in terms of the number of OFDM tones), the access terminal 120 can benefit from higher transmission power while remaining in compliance with power spectral density restrictions.

The sPUCCH signaling concepts of the present disclosure may also be applied to downlink signaling. For example, the access point 110 may transmit acknowledgements to the access terminal 120 in response to uplink transmissions received from the access terminal 120. Conventionally, the access point 110 may transmit acknowledgements over the Physical Downlink Control Channel (PDCCH). However, the access point 110 may adopt the short common control signaling of the present disclosure so as to minimize contention for the communication medium 132. For example, the access point 110 may dynamically adjust a duration of the PDCCH by limiting acknowledgements to one symbol period.

Figure 5:
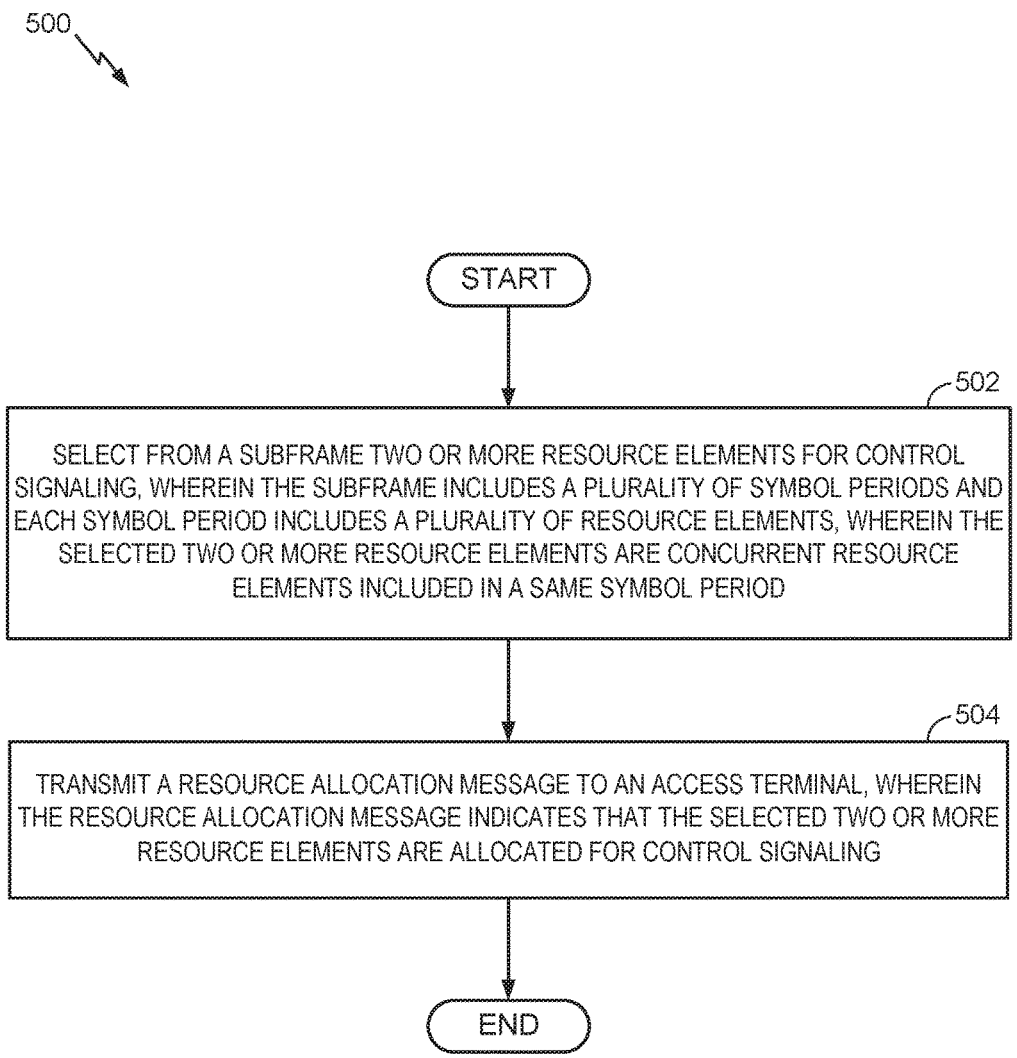
FIG. 5 is a flow diagram illustrating an example method of communication in accordance with the techniques described herein.

FIG. 5 is a flow diagram illustrating an example method of communication in accordance with the techniques described above. The method 500 may be performed, for example, by an access point (e.g., the access point 110 illustrated in FIG. 1).

As shown, the access point may select for control signaling two or more resource elements from a subframe comprising a plurality of resource elements, each resource element being associated with one symbol period of a plurality of symbol periods within the subframe, the selected two or more resource elements being concurrent resource elements included in a same symbol period (block 502). The selecting may be performed, for example, by a processor and memory such as the processing system 116 and memory component 118 or the like. The access point may further transmit a resource allocation to an access terminal, the resource allocation indicating the selected two or more resource elements as a control signaling portion of the subframe (block 504). The transmitting may be performed, for example, by a processor and memory such as the processing system 116 and memory component 118 or the like.

For convenience, the access point 110 is shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 6:
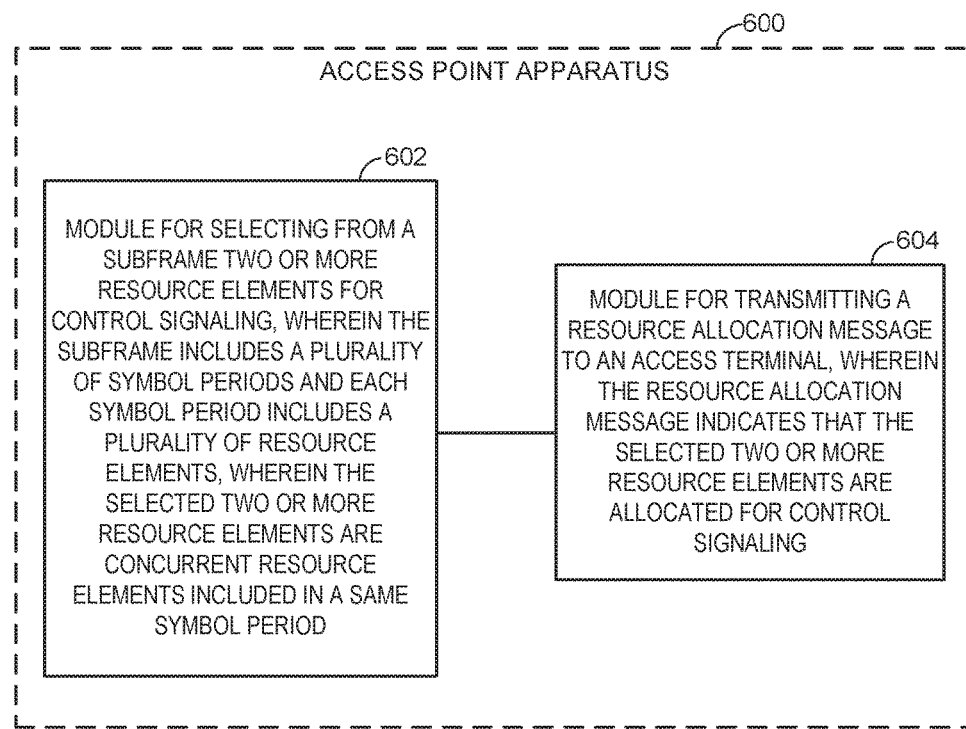
FIG. 6 illustrates an example apparatus represented as a series of interrelated functional modules.

FIG. 6 provides an alternative illustration of an apparatus for implementing the access point 110 represented as a series of interrelated functional modules.

FIG. 6 illustrates an example apparatus 600 represented as a series of interrelated functional modules. A module for selecting for control signaling two or more resource elements from a subframe comprising a plurality of resource elements, each resource element being associated with one symbol period of a plurality of symbol periods within the subframe, the selected two or more resource elements being concurrent resource elements included in a same symbol period 602 may correspond at least in some aspects to, for example, a communication controller or a component thereof as discussed herein (e.g., the communication controller 114 or the like). A module for transmitting a resource allocation to an access terminal, the resource allocation indicating the selected two or more resource elements as a control signaling portion of the subframe 604 may correspond at least in some aspects to, for example, a communication device or a component thereof as discussed herein (e.g., the communication device 112 or the like).

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

Figure 7:
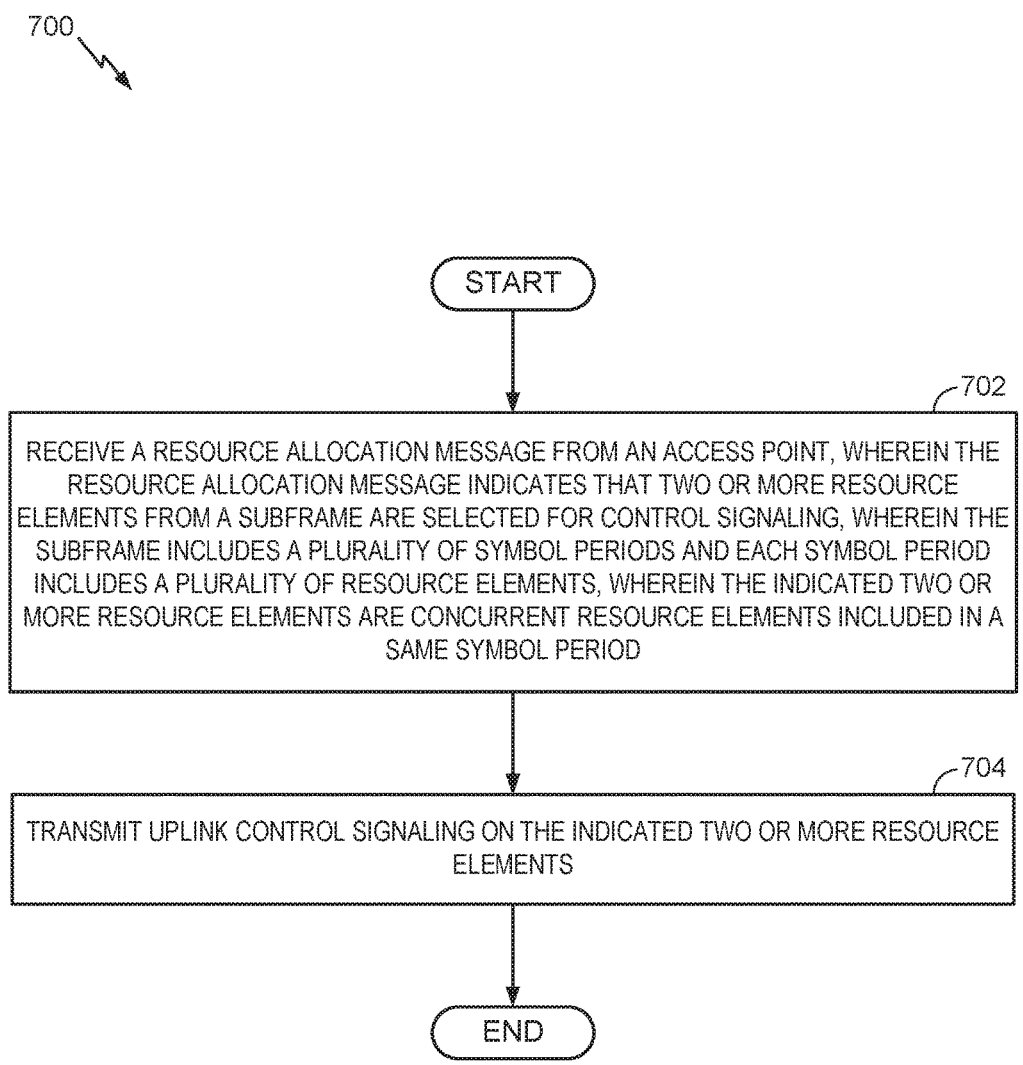
FIG. 7 is a flow diagram illustrating an example method of communication in accordance with the techniques described herein.

FIG. 7 is a flow diagram illustrating an example method of communication in accordance with the techniques described above. The method 700 may be performed, for example, by an access terminal (e.g., the access terminal 120 illustrated in FIG. 1).

As shown, the access terminal may receive a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period (block 702). The receiving may be performed, for example, by a communication device such as the communication device 122 or the like. The access terminal 120 may further transmit uplink control signaling on the indicated two or more resource elements (block 704). The transmitting may be performed, for example, by a communication device such as the communication device 122 or the like.

For convenience, the access terminal 120 shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 8:
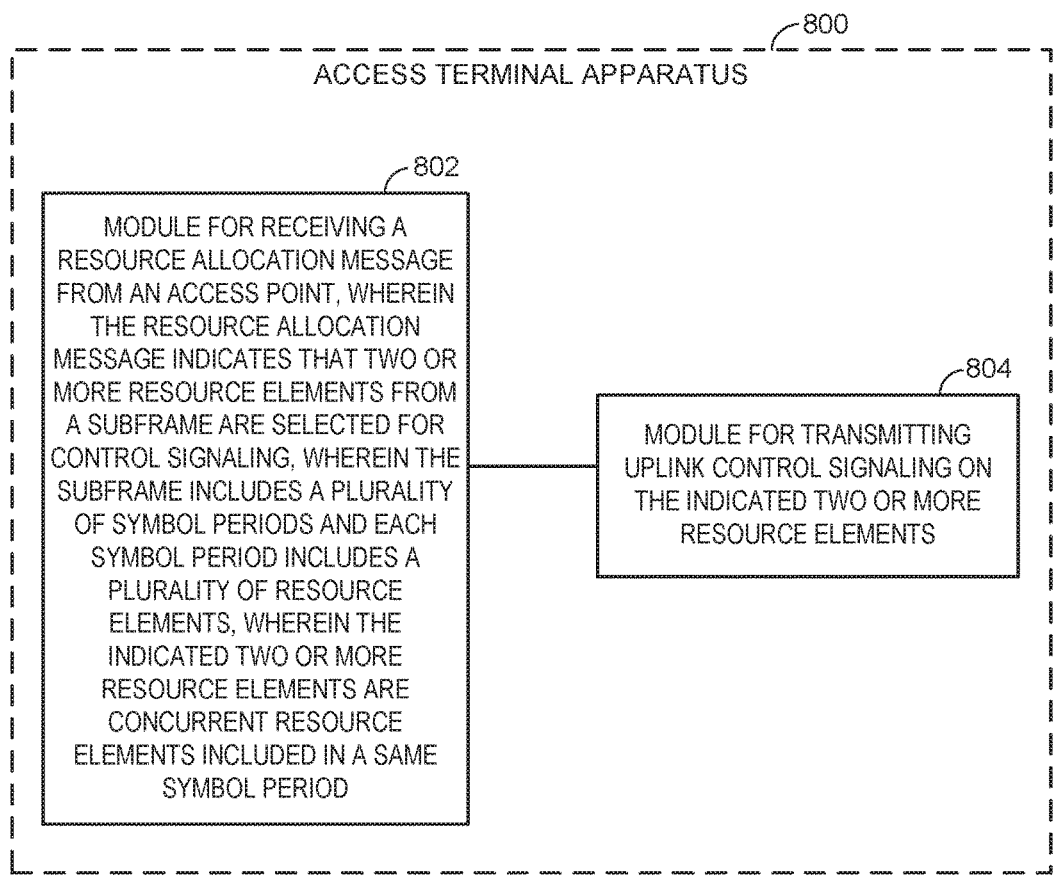
FIG. 8 illustrates an example apparatus represented as a series of interrelated functional modules

FIG. 8 provides an alternative illustration of an apparatus for implementing the access terminal 120 represented as a series of interrelated functional modules.

FIG. 8 illustrates an example apparatus 800 represented as a series of interrelated functional modules. A module for receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period 802 may correspond at least in some aspects to, for example, a communication controller or a component thereof as discussed herein (e.g., the communication controller 122 or the like). A module for transmitting uplink control signaling on the indicated two or more resource elements 804 may correspond at least in some aspects to, for example, a communication device or a component thereof as discussed herein (e.g., the communication device 122 or the like).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication, comprising:
selecting from a subframe two or more resource elements for control signaling, wherein the subframe includes a plurality of symbol periods and each symbol period includes a plurality of resource elements, wherein the selected two or more resource elements are concurrent resource elements included in a same symbol period; and
transmitting a resource allocation message to an access terminal, wherein the resource allocation message indicates that the selected two or more resource elements are allocated for control signaling,
wherein the selected two or more resource elements are resource elements of a shared communication medium shared by the access terminal operating in a first radio access technology (RAT) and by at least one other device operating in a second RAT different from the first RAT.

2. The method of claim 1, wherein each resource element of the plurality of resource elements is associated with one tone of a plurality of tones, the selected two or more resource elements including a first resource element associated with a first tone of the plurality of tones and a second resource element associated with a second tone different from the first tone.

3. The method of claim 2, the first resource element being associated with a first resource block and the second resource element being associated with a second resource block different from the first resource block.

4. The method of claim 3, the first resource block being separated from the second resource block by at least one unselected resource block that is not selected for control signaling.

5. The method of claim 3, wherein each of the first resource block and the second resource block is a long-term evolution (LTE) resource block that includes seven successive symbol periods and twelve adjacent tones.

6. The method of claim 1, wherein the same symbol period associated with the selected two or more resource elements includes less than five percent of a total number of symbol periods within a radio frame, wherein the remaining symbol periods do not include any resource elements that are allocated for control signaling.

7. The method of claim 1, further comprising:
receiving, from the access terminal, uplink control signaling on the selected two or more resource elements.

8. The method of claim 7, further comprising, in response to the receiving of the uplink control signaling:
selecting for downlink control signaling two or more subsequent resource elements from a subsequent subframe, wherein the selected two or more subsequent resource elements are concurrent resource element included in a subsequent symbol period; and
transmitting downlink control signaling using the selected two or more subsequent resource elements.

9. The method of claim 8, wherein the downlink control signaling includes an acknowledgement (ACK).

10. The method of claim 1, further comprising:
selecting from the subframe one or more successive resource elements for control signaling, wherein the one or more successive resource elements are included in one or more successive symbol periods to the symbol period in which the selected two or more resource elements are included; and
wherein the resource allocation message indicates that the selected two or more resource elements and the one or more successive resource elements are allocated for control signaling.

11. An apparatus comprising:
at least one processor;
at least one memory coupled to the at least one processor, the at least one processor and at least one memory being configured to:
select from a subframe two or more resource elements for control signaling, wherein the subframe includes a plurality of symbol periods and each symbol period includes a plurality of resource elements, wherein the selected two or more resource elements are concurrent resource elements included in a same symbol period; and
a transceiver, the transceiver being configured to:
transmit a resource allocation message to an access terminal, wherein the resource allocation message indicates that the selected two or more resource elements are allocated for control signaling,
wherein the selected two or more resource elements are resource elements of a shared communication medium shared by the access terminal operating in a first radio access technology (RAT) and by at least one other device operating in a second RAT different from the first RAT.

12. The apparatus of claim 11, wherein each resource element of the plurality of resource elements is associated with one tone of a plurality of tones, the selected two or more resource elements including a first resource element associated with a first tone of the plurality of tones and a second resource element associated with a second tone different from the first tone.

13. The apparatus of claim 12, the first resource element being associated with a first resource block and the second resource element being associated with a second resource block different from the first resource block.

14. The apparatus of claim 13, the first resource block being separated from the second resource block by at least one unselected resource block that is not selected for control signaling.

15. The apparatus of claim 13, wherein each of the first resource block and the second resource block is a long-term evolution (LTE) resource block that includes seven successive symbol periods and twelve adjacent tones.

16. The apparatus of claim 11, wherein the same symbol period associated with the selected two or more resource elements includes less than five percent of a total number of symbol periods within a radio frame, wherein the remaining symbol periods do not include any resource elements that are allocated for control signaling.

17. The apparatus of claim 11, wherein the transceiver is further configured to:
receive, from the access terminal, uplink control signaling on the selected two or more resource elements.

18. The apparatus of claim 17, wherein, in response to the receiving of the uplink control signaling, the at least one processor and the at least one memory are further configured to:
select for downlink control signaling two or more subsequent resource elements from a subsequent subframe, wherein the selected two or more subsequent resource elements are concurrent resource elements included in a subsequent symbol period; and
transmit downlink control signaling using the selected two or more subsequent resource elements.

19. The apparatus of claim 18, wherein the downlink control signaling includes an acknowledgement (ACK).

20. The apparatus of claim 11, wherein:
the at least one processor and at least one memory being further configured to select from the subframe one or more successive resource elements for control signaling, wherein the one or more successive resource elements are included in one or more successive symbol periods to the symbol period in which the selected two or more resource elements are included; and
the resource allocation message indicates that the selected two or more resource elements and the one or more successive resource elements are allocated for control signaling.

21. An apparatus, comprising:
means for selecting from a subframe two or more resource elements for control signaling, wherein the subframe includes a plurality of symbol periods and each symbol period includes a plurality of resource elements, wherein the selected two or more resource elements are concurrent resource elements included in a same symbol period; and
means for transmitting a resource allocation message to an access terminal, wherein the resource allocation message indicates that the selected two or more resource elements are allocated for control signaling,
wherein the selected two or more resource elements are resource elements of a shared communication medium shared by the access terminal operating in a first radio access technology (RAT) and by at least one other device operating in a second RAT different from the first RAT.

22. A non-transitory computer-readable medium comprising at least one instruction for causing a computer or processor to perform operations, comprising:
code for selecting from a subframe two or more resource elements for control signaling, wherein the subframe includes a plurality of symbol periods and each symbol period includes a plurality of resource elements, wherein the selected two or more resource elements are concurrent resource elements included in a same symbol period; and
code for transmitting a resource allocation message to an access terminal, wherein the resource allocation message indicates that the selected two or more resource elements are allocated for control signaling,
wherein the selected two or more resource elements are resource elements of a shared communication medium shared by the access terminal operating in a first radio access technology (RAT) and by at least one other device operating in a second RAT different from the first RAT.

23. A method of communication, comprising:
receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period; and
transmitting uplink control signaling on the indicated two or more resource elements,
wherein the selected two or more resource elements are resource elements of a shared communication medium shared by the access point operating in a first radio access technology (RAT) and by at least one other device operating in a second RAT different from the first RAT.

24. The method of claim 23, wherein each resource element of the plurality of resource elements is associated with one tone of a plurality of tones, the selected two or more resource elements including a first resource element associated with a first tone of the plurality of tones and a second resource element associated with a second tone different from the first tone.

25. The method of claim 24, the first resource element being associated with a first resource block and the second resource element being associated with a second resource block different from the first resource block.

26. The method of claim 25, the first resource block being separated from the second resource block by at least one unselected resource block that is not selected for control signaling.

27. The method of claim 25, wherein each of the first resource block and the second resource block is a long-term evolution (LTE) resource block that includes seven successive symbol periods and twelve adjacent tones.

28. The method of claim 23, wherein the same symbol period associated with the selected two or more resource elements includes less than five percent of a total number of symbol periods within a radio frame, wherein the remaining symbol periods do not include any resource elements that are allocated for control signaling.

29. The method of claim 23, further comprising:
receiving, from the access point, downlink control signaling on the selected two or more resource elements.

30. The method of claim 29, wherein the downlink control signaling includes an acknowledgement (ACK).

31. An apparatus, comprising:
means for receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period; and
means for transmitting uplink control signaling on the indicated two or more resource elements,
wherein the selected two or more resource elements are resource elements of a shared communication medium shared by the access point operating in a first radio access technology (RAT) and by at least one other device operating in a second RAT different from the first RAT.

32. A non-transitory computer-readable medium comprising at least one instruction for causing a computer or processor to perform operations, comprising:
code for receiving a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period; and
code for transmitting uplink control signaling on the indicated two or more resource elements,
wherein the selected two or more resource elements are resource elements of a shared communication medium shared by the access point operating in a first radio access technology (RAT) and by at least one other device operating in a second RAT different from the first RAT.

33. An apparatus comprising:
at least one processor;
at least one memory coupled to the at least one processor, the at least one processor and at least one memory being configured to receive a resource allocation message from an access point, wherein the resource allocation message indicates that two or more resource elements from a subframe are selected for control signaling, wherein the subframe includes a plurality of symbol periods and each symbol period includes a plurality of resource elements, wherein the indicated two or more resource elements are concurrent resource elements included in a same symbol period; and
a transceiver, the transceiver being configured to transmit uplink control signaling on the indicated two or more resource elements,
wherein the selected two or more resource elements are resource elements of a shared communication medium shared by the access point operating in a first radio access technology (RAT) and by at least one other device operating in a second RAT different from the first RAT.

34. The apparatus of claim 33, wherein each resource element of the plurality of resource elements is associated with one tone of a plurality of tones, the selected two or more resource elements including a first resource element associated with a first tone of the plurality of tones and a second resource element associated with a second tone different from the first tone.

35. The apparatus of claim 34, the first resource element being associated with a first resource block and the second resource element being associated with a second resource block different from the first resource block.

36. The apparatus of claim 35, the first resource block being separated from the second resource block by at least one unselected resource block that is not selected for control signaling.

37. The apparatus of claim 35, wherein each of the first resource block and the second resource block is a long-term evolution (LTE) resource block that includes seven successive symbol periods and twelve adjacent tones.

38. The apparatus of claim 33, wherein the same symbol period associated with the selected two or more resource elements includes less than five percent of a total number of symbol periods within a radio frame, wherein the remaining symbol periods do not include any resource elements that are allocated for control signaling.

39. The apparatus of claim 33, further comprising:
receiving, from the access point, downlink control signaling on the selected two or more resource elements.

40. The apparatus of claim 39, wherein the downlink control signaling includes an acknowledgement (ACK).

* * * * *